United States Patent [19]
Zehavi et al.

[11] 3,724,518
[45] Apr. 3, 1973

[54] TREE FEED ROLL ASSEMBLY

[75] Inventors: Samuel Zehavi, Cote St. Luc; Joseph J. R. Boivin, Montreal; Douglas D. Hamilton, Town of Mount Royal; Raoul Ranzenhofer, Pointe Claire, all of Quebec, Canada

[73] Assignee: Canadian International Paper Company; North Shore Paper Company, both of Montreal, Abitibi St. Anne Paper Ltd., Beaupre, all of Quebec, Canada; a part interest to each

[22] Filed: Mar. 12, 1971

[21] Appl. No.: 123,804

[30] Foreign Application Priority Data

Mar. 13, 1970 Canada..................................77403

[52] U.S. Cl..................144/247, 144/2 Z, 144/208 E
[51] Int. Cl.............................B27l 1/00, B27l 11/02
[58] Field of Search.......144/247, 246, 208 E, 208 R, 144/2 Z, 3 D; 143/55 R, 55 A, 55 B, 56

[56] References Cited

UNITED STATES PATENTS

| | | | |
|---|---|---|---|
| 3,519,044 | 7/1970 | Rother | 144/208 E |
| 3,633,638 | 1/1972 | Groves | 144/2 Z |
| 2,794,466 | 6/1957 | Leffler | 144/247 |

*Primary Examiner*—Donald R. Schran
*Attorney*—Cushman, Darby & Cushman

[57] ABSTRACT

A feed roll assembly for propelling trees endwise along a selected path and including two sets of arms pivotally mounted on a frame with one set extending a greater distance from the frame than the other set, one set of said arms being located on one side of the feed path and the other set on the opposite side of each arm having a driven roll cantilevered therefrom to overlap said path.

15 Claims, 7 Drawing Figures

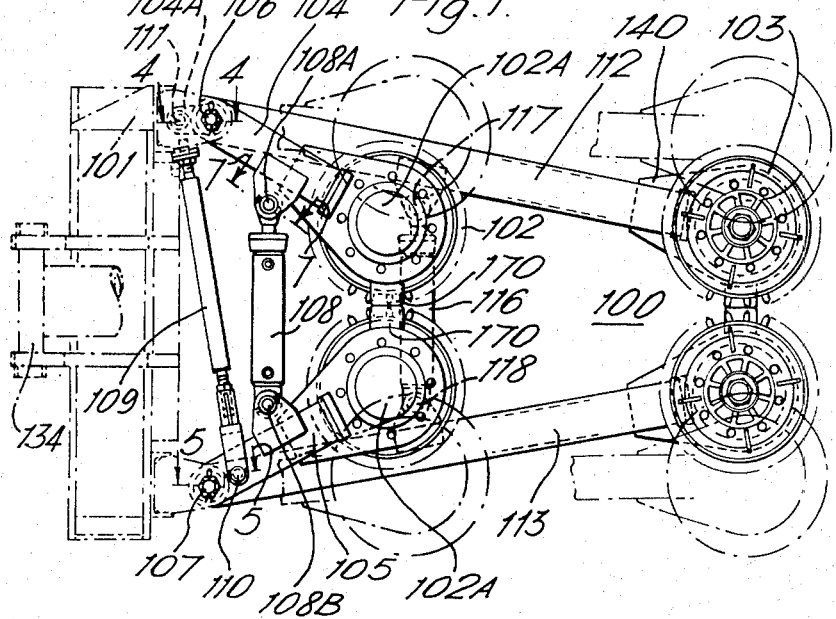
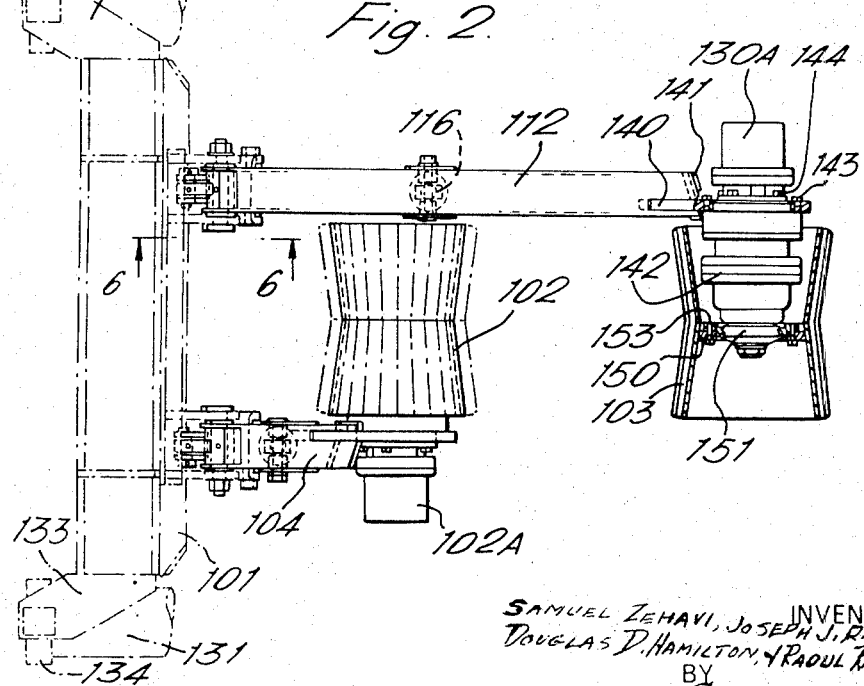

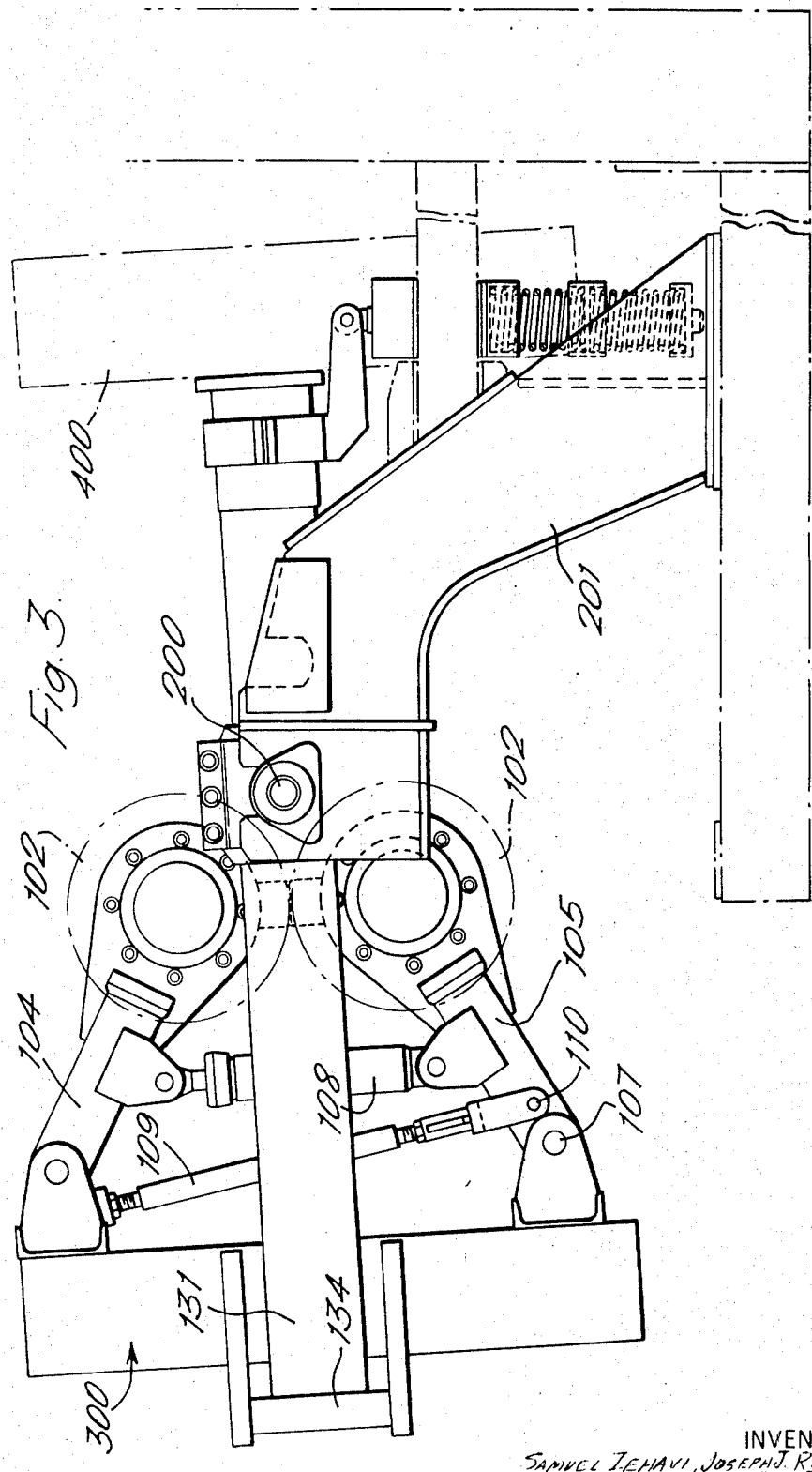

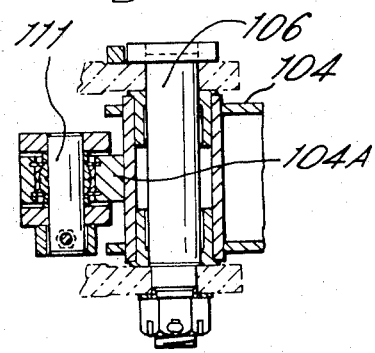
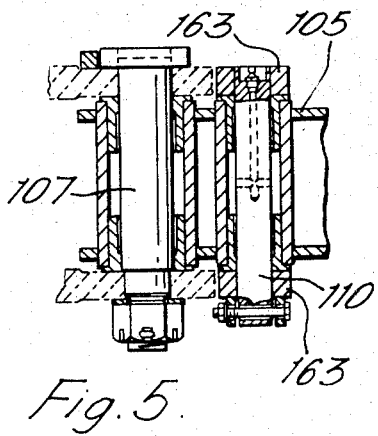
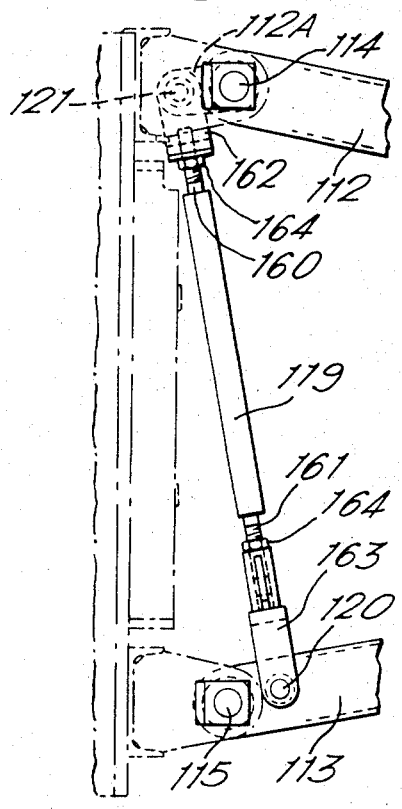
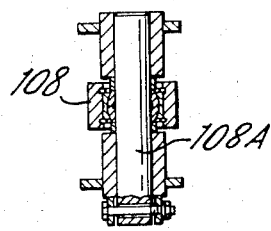

TREE FEED ROLL ASSEMBLY

This invention relates to a tree or log feeding mechanism and to such mechanism in combination with tree processing units.

Numerous types of tree feeding mechanisms are known, two of the most common being feed rolls and moving clamp. An example of the latter is disclosed in Hahn's U.S. Pat. No. 3,398,774 issued Aug. 27, 1968. Examples of feed roll types are disclosed in Hamilton's U.S. Pat. No. 3,351,107 issued Nov. 7, 1967; Thompson et al. U.S. Pat. No. 3,464,468 issued Sept. 2, 1969; Leffler's U.S. Pat. No. 2,891,589 issued June 23, 1959; Brundell et al. U.S. Pat. No. 2,785,715 issued Mar. 19, 1957; Nicholson's Canadian Pat. No. 601,739 issued July 19, 1960; Hamilton's Canadian Pat. No. 807,454 issued Mar. 4, 1969; Leffler's U.S. Pat. No. 2,794,466 issued June 4, 1957; and Eklund's Canadian Pat. No. 494,454 issued July 14, 1953.

It will be appreciated when viewing some of the aforementioned prior art that the tree feeding mechanisms are generally tailored to suit various tree processing packages. For example, the tree processor in the Hamilton apparatus is of the continuous processing type, wherein the feed mechanism, which includes feed rolls, propels trees along a selected feed path without stopping the tree during its travel while one or more processing operations are performed thereon. It will be noted that the apparatus includes a delimber of the rotary ring type having moving milling type cutters orbiting the log. Delimbers of this type do not require tree feeding mechanisms having high pulling forces to move the tree through the delimber, in comparison with delimbers of the stripper type, an example of which is disclosed in the aforementioned Hahn patent.

The Hahn apparatus employs a clamp type feed mechanism and although it provides adequate forces on the tree to pull the same through the stripper type delimber, the apparatus has the disadvantage of being of the intermittent feed type. Unlike the Hamilton apparatus, it feeds the trees to be processed in selected steps along the processing feed path, stopping the same to carry out the processing operation of shearing the tree into sections. This results in a machine of relatively low production capacity compared to the Hamilton apparatus.

A further advantage of the Hamilton apparatus over the art, is the compact arrangement of the processing package which takes up a small amount of space compared to most multi-processing packages, and such compact arrangement permits the processing package to be pivotally mounted as discussed in U.S. Pat. No. 3,351,107. The present invention may be readily utilized in such apparatus as an alternative feed works to that used so as to provide improved tree feeding when for example a stripper type delimber is used in place of the delimber disclosed in said patent.

The prior art examples disclose feed rolls which are not readily adapted to use in processing units utilizing stripper type delimbers handling trees up to eighteen inches diameter, having tree feeding speeds of up to three hundred feet per minute, and feeding forces of up to ten thousand pounds capacity, due mainly to the fact that the feed rolls and associated structure would be required to be of such large dimension in keeping with the high feeding forces required that they would prove impractical as a compact arrangement.

Other types of known tree feeding mechanisms include utilizing chains having gripper lugs attached thereon and adapted to grip a tree and propel the same along a selected feed path. Some such arrangements comprise two or more chains positioned in side-by-side relationship with gripper lugs facing one another and adapted to contact a log disposed therebetween. Using such devices in combination with tree processing units requiring high tree propelling forces results in relatively long chains required to obtain the necessary tractive effort to propel the logs and thus is not a compact feeding mechanism.

The aforementioned Leffler U.S. Pat. No. 2,794,466 discloses means to equalize movement of each feed roll with respect to a feed path axis passing between said rolls, but such means is located remote from the feed roll arms and is not, as disclosed in the preferred embodiment of the present invention, secured directly to and between each of the feed roll arm members. Such arrangement provides a very compact feeding mechanism.

It is a prime object of the present invention to provide a novel compact tree or log feeding mechanism which can be readily used in conjunction with tree processing units wherein at least one of which is a stripper type delimber, or tree processing unit requiring relatively high forces to pull a tree therethrough.

It is a further particular object of the present invention to provide a novel tree or log feeding mechanism which is capable of feeding trees of up to at least eighteen inches in diameter at feed speeds of up to at least three hundred feet per minute through tree processing units wherein at least one of said tree processing units is of the stripper delimber type, said mechanism having at least a ten thousand pound pulling capacity.

It is a further object of the present invention to provide an alternative tree or log feeding mechanism to that disclosed and claimed in the aforementioned Hamilton Patent and wherein the delimber is of a stripper type.

It is still a further object of the present invention to provide a novel tree or log feeding mechanism which may be mounted in the downstream or upstream feed path of processing units whereby the mechanism respectively pulls or pushes the trees through said processing units, alternatively to provide a novel tree or log feeding mechanism which may be mounted both upstream and downstream of a processing unit and attached directly thereto.

It is still a further object to provide a tree or log feeding mechanism which is of simple design, avoiding the use of expensive and complicated gear reduction drive means.

Other objects and advantages will become evident from the following detailed description.

In one aspect of the invention there is provided a tree or log feeding or propelling means comprising in combination:

a. a pair of feed rolls, each roll being pivotally secured to the free ends of respective ones of a pair of arm members pivotally secured to a common frame, said feed rolls being positioned for movement towards and away from a feed path axis passing between said feed rolls;

b. spring means associated with said arm members urging said feed rolls in a direction towards one another;

c. means secured directly to and between each of said arm members for the purpose of equalizing movement of each of said feed rolls with respect to said feed path axis upon introduction of a log or the like between said feed rolls; and d. means to drive said feed rolls.

The invention is illustrated, by way of example, in the accompanying drawings wherein:

FIG. 1 is a side elevational view of a tree or log feeding mechanism in accordance with the present invention;

FIG. 2 is a plan view of the mechanism shown in FIG. 1;

FIG. 3 is a part side elevational view of a tree processing assembly incorporating a tree or log feeding mechanism in accordance with the present invention;

FIG. 4 is a part sectional view taken along line 4—4 in FIG. 1;

FIG. 5 is a part sectional view taken along line 5—5 in FIG. 1;

FIG. 6 is a part elevational view taken along line 6—6 in FIG. 2; and

FIG. 7 is a part sectional view taken along line 7—7 in FIG. 1.

Referring now in detail to the drawings, FIG. 1 discloses a tree or log feeding mechanism 100 comprising a frame 101, a first pair of driven feed rolls 102 and a second pair of driven feed rolls 103 each mounted on the free end of an arm pivotally attached to the frame 101.

Feed rolls 102 are pivotally secured to respective arm members 104 and 105 which in turn are pivotally secured to frame 101 by respective pivots 106 and 107. A fluid actuated piston-cylinder 108 is pivotally attached at opposed ends to respective arm members 104 and 105 by pins 108A and 108B on one side of the respective pivots 106 and 107 to move the rolls 102 toward and away from one another. The fluid actuated piston-cylinder assembly 108 serves as a spring means biasing the arms toward one another and for this purpose any well-known accumulator type of piston-cylinder assembly may be used. An adjustable length equalizer member 109 is pivotally connected at one end to arm member 105 by pin 110 and at the opposite end to an extension 104A of arm 104 by a pin 111.

The second pair of feed rolls 103 is pivotally mounted on the free end of arm members 112 and 113 which in turn are pivotally attached to frame 101 by respective pins 114 and 115. A fluid actuated piston-cylinder 116 is pivotally attached at opposed ends to respective arm members 112 and 113 by pins 117 and 118. Arm members 112 and 113 are further interconnected by an adjustable length equalizer bar 119 pivotally connected at one end by pin 120 to arm member 113 and at the opposite end by a pin 121 to an extension 112A of arm member 112.

A pair of fluid actuated motors 102A drives respective ones of the pair of feed rolls 102 and likewise a pair of fluid actuated motors 103A drives respective ones of the pair of feed rolls 103.

Frame 101 may, as illustrated, be part of a processing unit namely a stripper type delimber or alternatively, by any suitable member structurally designed to support and withstand forces imposed upon the same by the remaining part of the feed mechanism structure. Frame 101 is supported on a pair of rails 130 and 131 by respective lug members 132 and 133 secured to frame 101 by welding and suitably apertured to receive collars 134.

Arm members 104, 105, 112 and 113 are of similar construction and, as illustrated, may each consist of a tubular or box member notched to receive a feed roll and motor mounting plate 140 secured in place by welding. The respective ends of the arm members are reinforced with plates 141 welded thereto. The feed roll and motor mounting plates 140 each have a central aperture receiving a hydrostatic planetary speed reducer 142 attached to the plate 140 associated therewith by a plurality of bolt and nut assemblies 143. The fluid actuated motor associated with the respective speed reducer 142 is detachably secured thereto by stud and nut assemblies 144. It will be noted from FIG. 2 the motor is located on one side of the mounting plate 140 and the speed reducer projects from the other side having the feed roll associated therewith attached to such projecting portion.

The hydrostatic planetary drive may be of any suitable type of commercially available models such as for example model TP100798 manufactured under the trade name Michigan Transaxle.

Each feed roll of pairs 102 and 103 is of fabricated construction having an internal mounting rim 150 apertured to receive hub 151, an output of hydrostatic planetary speed reducer 142, and secured thereto by bolt and nut assemblies 153. The internal rim 150 is secured by welding or the like to a cylindrical member having an external "V" surface cleated about the periphery of the roll. The cleats comprise relatively narrow strips running the full width of the feed roll and are spaced at selected intervals about the circumference thereof and have edges adapted to grip and thereby propel a tree in contact with the same. The external "V" shape of the feed rolls is well known and serves to center a tree or log coincident with the feed path axis or center line feed path intersecting the base of the aforementioned "V," running normal to the rotating axis of the feed rolls.

Referring to FIGS. 1 and 6, equalizer members 109 and 119 each consist of a rod member having threaded ends 160 and 161 respectively to receive forked members 162 and 163 threaded thereon and locked in place by nuts 164. Referring to FIG. 5, fork member 163 of equalizer member 109 straddles arm member 105. Similarly fork member 163 of equalizer 119 straddles arm member 113. From FIG. 4, it will be noted the forked member 162 of equalizer 109 straddles extension 104A of arm member 104. A similar arrangement is used connecting the forked member 162 of equalizer 119 to extension 112A of arm 112. Bearings may be used mounting the various pivot pins with lubrication being provided by fittings and associated passages in the respective joints.

It will be realized that by lengthening or shortening the equalizer members 109 and 119, feed rolls of respective pairs 102 and 103 may be moved relative to one another. It will be realized that the equalizer members 109 and 119 are connected to the feed roll arm members associated therewith in such a manner with respect to the arm pivots as to co-ordinate movement of the arms providing equal movement in the same. Referring to FIG. 1, the lower arms have the equalizer pivotal connections positioned to the right of the arm pivotal connections and the upper arms have the equalizer pivotal connections positioned to the left of the arm pivotal connections, thereby ensuring that when a tree is forced between the respective pairs of feed rolls against the clamping forces of fluid actuated cylinders 108 and 116, each upper and lower feed roll arm moves the same distance relative to the common feed path axis passing between the feed rolls. Movement of the arms in a direction toward one another may be limited by stops 170 welded to motor mounting plates 140 or alternatively made part of such motor mounting plates.

In further referring to FIG. 2, it will be readily appreciated that the tree or log feeding mechanism embodiment shown is of particular compact design and contributing factors to this include housing part of the feed roll drive mechanism within the feed rolls proper, the positioning of the feed rolls to face one another having the feed roll supporting arms positioned in the manner disclosed, positioning the pairs of feed rolls in optimum selected positions along the tree feed path axis both relative to themselves and frame 101.

In FIGS. 1 and 2, a flying shear unit (not shown) may be positioned downstream of the pair of feed rolls 103 and mounted on rails 131 and 132 in the same manner disclosed in the aforementioned U.S. Pat. No. 3,351,107. The flying shear may be of any suitable type, for example the one disclosed in the aforementioned U.S. Pat. No. 3,351,107 or alternatively the one disclosed in Hamilton's Canadian Pat. No. 791,445 dated Aug. 6, 1968.

FIG. 3 discloses a processing package, pivotally mounted by trunnions 200 on a pair of cantilever frame members 201. The processing package utilizes a log or tree feeding mechanism illustrated in FIGS. 1 and 2 attached to a stripper delimber 300 and a flying shear 400 located on the outfeed side of the feed rolls.

Although two sets of feed rolls are disclosed in the preferred embodiment shown in FIGS. 1 and 2, it is realized that only one set of feed rolls may be used as shown in FIG. 3. Conversely, additional sets of feed rolls may be used in ganged relation, such embodiments being primarily dependent on related tree feeding arrangements and tractive feeding effort requirements.

An important alternative embodiment may consist of a processing unit having a frame similar to frame 101 wherein at least one pair of feed rolls mounted in accordance with the preferred embodiment of the present invention, are mounted on each side of frame 101. Such embodiment thereby provides a pulling and pushing arrangement in feeding a log or tree.

In operation, a tree to be processed is fed by suitable means, butt end first, through a central aperture in the delimber unit frame 101 (no delimbing tools contacting the tree). All the feed rolls are then set in motion, specifically the upper feed rolls rotate counter-clockwise and the lower feed rolls rotate clockwise, each feed roll being individually powered by motor means. When the butt end of the tree contacts the first pair of feed rolls 102, the feed rolls are forced apart against the clamping action of fluid cylinder 108 and at the same time equalizer 109 ensures the feed rolls 102 open equidistant about the feed path axis passing between the feed rolls. As the feed rolls climb up onto the outside diameter of the tree trunk they immediately grip and propel the tree along the said feed path in a direction away from the delimber unit. The second set of feed rolls 103 act similarly to the first set of feed rolls 102 when contacted by the moving tree butt, namely they open up to grip the tree and thus add to the propelling forces driving the tree through the delimbing unit. Immediately the tree engages the first set of feed rolls 102 the delimber cutting knives are brought into contact with the tree and thus commence to delimb the same.

As mentioned previously, tree processing units of any type may be disposed downstream of the feed rolls such as the aforementioned flying shear. The operation of such shear or other processing units mounted upstream or downstream of the tree feeding mechanism may be made dependent on certain physical movements or electrical switching or the like of the feed rolls, i.e. partial opening of the shear unit to receive a size of tree determined by the opening of the feed rolls as they accommodate the tree. Likewise opening of the feed rolls may determine the operation of the cutting tools of the delimber.

Power for the various components namely fluid actuated motors, fluid actuated cylinder assemblies and processing unit functions, are supplied via suitable means from a suitable source such as hydraulic pumps driven by a prime mover mounted adjacent the processing package, and the whole being mounted for either mobile or stationary operation.

We claim:

1. A tree or log feeding or propelling apparatus comprising in combination:
    a. a frame;
    b. a pair of arm members pivotally secured adjacent one end thereof to said frame in vertical offset relation relative to one another;
    c. a motor secured to each of said arms adjacent the free ends thereof;
    d. a pair of feed rolls secured to respective ones of said motors in driving relationship, said feed rolls being positioned for movement towards and away from a feed path axis passing between said feed rolls;
    e. a fluid actuated piston-cylinder assembly pivotally secured to and interconnecting said arm members and urging said feed rolls in a direction towards one another; and
    f. link means secured directly to said arm members on opposite sides of their respective pivotal connections to said common frame, equalizing movement of said pair of feed rolls with respect to said feed path axis in movement thereof towards and away therefrom, said link means including adjustment means selectively variously positioning the feed rolls relative to said common frame.

2. A tree or log feeding or propelling apparatus as defined in claim 1 including a second pair of feed rolls located in spaced relation with respect to said pair of feed rolls at a position between the latter and said frame, motor means mounting said second pair of feed rolls on respective ones of a pair of further arm members, pivotally attached to said frame, said second pair of feed rolls being positioned for movement towards and away from said feed path axis, a fluid actuated piston-cylinder assembly interconnecting said further pair of arm members urging said second pair of feed rolls in a direction towards one another, link means secured directly to said further pair of arm members interconnecting the same equalizing movement of said second pair of feed rolls in a direction towards and away from said feed path axis and means to adjust said latter link means selectively variously positioning said second pair of feed rolls relative to said frame.

3. A tree feeding apparatus as defined in claim 1 wherein said motors each comprise a fluid actuated motor and transmission attached thereto.

4. A tree feeding apparatus as defined in claim 3 wherein each said motor is located partly within the feed roll associated therewith.

5. A tree feeding apparatus as defined in claim 1 wherein said equalizing means includes a longitudinally adjustable rod-like member pivotally connected at opposed ends to respective ones of the arms mounting the feed rolls associated therewith.

6. A tree feeding apparatus as defined in claim 1 wherein said arm members are box-like structures having mounting plates attached adjacent the free end thereof.

7. A tree feeding means as defined in claim 1 wherein said frame comprises part of a tree processing unit.

8. A tree feeding apparatus as defined in claim 7 wherein said tree processing unit is a stripper type delimber.

9. A tree feeding apparatus as defined in claim 7 including an additional tree processing unit located in tandem axial alignment with said tree processing unit.

10. A tree feeding apparatus as defined in claim 2 including a second set of feed rolls positioned in tandem axial alignment on a side of said processing unit opposite to that of said pair of feed rolls, motor means mounting said second set of feed rolls on the free end of respective ones of a further pair of arm members pivotally secured to said frame, said second feed rolls being positioned for movement towards and away from a feed path axis passing between said second feed rolls; a fluid actuated piston-cylinder assembly interconnecting said further arm members urging said second set of feed rolls in a direction towards one another; link means secured directly to said further arm members interconnecting the same, equalizing movement of said second feed rolls toward and away from said feed path axis; and adjustment means for said link means selectively variously positioning said second feed rolls relative to said common frame.

11. A tree feeding apparatus as defined in claim 2 wherein said arms of said pair of feed rolls are located vertically one above the other on one side of a vertical plane passing through said feed path axis and the arms of said second pair of feed rolls are located vertically one above the other on the opposite side of said vertical plane.

12. A tree feeding apparatus as defined in claim 11 wherein the arms of the respective pairs of feed rolls are pivotally attached to said common frame in spaced vertical alignment one above the other.

13. A tree feeding apparatus as defined in claim 2 including means limiting movement of the feed rolls of respective pairs of said feed rolls in a direction towards one another.

14. A tree feeding apparatus as defined in claim 13 wherein said means limiting movement of the feed rolls is secured to said arm members.

15. A tree feeding apparatus for propelling trees endwise along a given path comprising:
 a. a frame;
 b. a pair of arm members pivotally attached adjacent one end thereof to said frame at respective first and second positions located vertically one above the other on one side of said given path;
 c. a second pair of arm members pivotally attached adjacent one end thereof to said frame at respective third and fourth positions located vertically one above the other on a side of the given path opposite to that of said first pair, said arms of each pair projecting from said frame with one pair projecting therefrom to a greater extent than the other in a direction generally parallel to said given path;
 d. a feed roll and motor unit for driving the same mounted on the free end of each arm and cantilevered therefrom transverse to said given path overlapping the same;
 e. first means interconnecting the arms of the respective pairs resiliently biasing the arms in such pairs in a direction toward one another; and
 f. second means interconnecting the arms of the respective pairs synchronizing movement of the rolls associated therewith during movement in a direction toward and away from one another, said second means comprising a link connected directly to the arms on opposite sides of the respective pivotal connections to said frame.

* * * * *